United States Patent [19]

Bullis et al.

[11] Patent Number: 4,954,925
[45] Date of Patent: Sep. 4, 1990

[54] CAPACITIVE SENSOR WITH MINIMIZED DIELECTRIC DRIFT

[75] Inventors: Robert H. Bullis, Avon; James L. Swindal, East Hampton; Walter J. Wiegand, Jr., Glastonbury; Charles B. Brahm, Ellington; Harold D. Meyer, South Windsor, all of Conn.

[73] Assignee: United Technologies Corporation, Hartford, Conn.

[21] Appl. No.: 292,282

[22] Filed: Dec. 30, 1988

[51] Int. Cl.⁵ ............................................. G01L 9/12
[52] U.S. Cl. .................................................. 361/283
[58] Field of Search .................... 73/718, 724; 361/283

[56] References Cited

U.S. PATENT DOCUMENTS

| | | | |
|---|---|---|---|
| 4,262,540 | 4/1981 | Tamai et al. | 73/718 |
| 4,467,394 | 8/1984 | Grantham et al. | 361/283 |
| 4,530,029 | 7/1985 | Beristain | 73/718 X |
| 4,628,403 | 12/1986 | Kuisma | 361/283 |
| 4,730,496 | 3/1988 | Knecht et al. | 73/718 X |

FOREIGN PATENT DOCUMENTS 2154747 9/1985 United Kingdom ................. 73/718

*Primary Examiner*—Donald A. Griffin

[57] ABSTRACT

Pressure sensors utilizing capacitance variations to sense pressure variations of the silicon-on-silicon type in which dielectric drift, which occurs in such sensors due to the changing characteristics primarily of the dielectric wall support layer (16) extending up from the silicon substrate (12) between it and the silicon diaphragm (11), is minimized by in turn minimizing the contribution of the dielectric layer to the total capacitance of the sensor (10), reducing the dielectric contribution of the capacitance from, for example, about fifty (50%) percent down to a range of no more than about twenty to twenty-five (20–25%) percent and down typically to sixteen to about ten (16%–10%) percent of the total capacitance or lower. Three exemplary approaches are illustrated, namely, etching the outer edges of the dielectric layer, making the wall(s) it form(s) thinner (FIG. 2); reducing the horizontal thickness of the effective peripheral, lower edge(s) of the silicon diaphragm where it interfaces in contact with the wall(s) formed by the dielectric layer (FIG. 3); and/or reducing the horizontal thickness of the effective peripheral, upper edge(s) of the silicon base or substrate where it interfaces with the wall(s) formed by the dielectric layer (FIUG. 4); and/or a combination of one or more of these approaches or any other approach that minimizes the effective capacitive contribution of the peripheral dielectric layer to the total capacitance of the sensor and hence to long term drift.

16 Claims, 2 Drawing Sheets

CAPACITIVE SENSOR WITH MINIMIZED DIELECTRIC DRIFT

TECHNICAL FIELD

This invention relates to pressure sensors utilizing capacitance variations to sense pressure variations, and more particularly the present invention relates to silicon-on-silicon pressure sensor designs which employ a silicon diaphragm, the movement of which due to changes in pressure varies the capacitance of the sensor and thus provides an output representative of the applied pressure. Even more particularly, the present invention relates to silicon-glass-silicon type sensors or transducers of the "sandwich" type, in which an extending glass wall supports the silicon diaphragm above but in juxtaposition to a stationary silicon substrate, and still more particularly to the minimizing of the dielectric drift which occurs in such sensors.

BACKGROUND ART

Capacitive pressure sensors are well known and employed in capacitance transducers, microphones, rupture discs, resonators, vibrators and like devices. Many of the applications for such capacitive pressure sensors require that the sensors be extremely small, for example, of the order of about eight millimeters by eight millimeters (8 mm×8 mm) or less.

Silicon capacitive pressure transducers are known in the art. For example, U.S. Pat. No. 3,634,727 to Polye discloses one type in which a pair of centrally apertured, conductive silicon plates are joined together with a eutectic metal bond, such that the silicon disc plates flex with applied pressure, changing the capacitance of the aperture interstice and providing a capacitive-type signal manifestation of pressure magnitude. This form of pressure transducer thus relies on the pressure-induced deflection of a thin diaphragm, in which the diaphragm deflection as a function of fluid pressure causes a variation in the distance between a pair of surfaces which effectively form the plates of a variable capacitor. Other examples of such silicon pressure sensors or transducers are included in the U.S. patents listed below.

In many high accuracy applications typical of those encountered in aerospace products, long-term drift (for example 20 years and longer) at an elevated temperature (for example 120° C. and higher) of the pressure sensing element limits the overall achievable system accuracy.

In an exemplary prior art, silicon-glass-silicon pressure sensor design of the sandwich type (note FIGS. 1 and 2), used as an exemplary baseline in the disclosure of the present invention, the dielectric spacer between the diaphragm and base, particularly in the upwardly extending wall support area formed by the dielectric layer at the operative periphery of the sensor, comprises approximately fifty (50%) percent of the total capacitance of the sensing element. In the present invention aging or drift in the electrical properties of this dielectric wall spacer, typically made of borosilicate glass, located typically at the periphery of the device, generally identified as "$C_p$", has been identified in the invention as being the major contributing factor to the drift of the sensing element.

As can be seen in FIGS. 1A and 1, the exemplary prior art silicon-on-silicon pressure sensor or transducer 10, which typically is generally square in its exterior configuration but often at least generally and preferably circular or cylindrical in shape for its inner, operative substructure, generally identified as "$C_c$" in FIG. 1, includes an upper, conductive, square, flexible, appropriately doped, silicon diaphragm 11 and a lower or bottom, conductive, appropriately doped, silicon base or substrate 12 with a non-conductive dielectric layer and spacer 13 (made of, for example, borosilicate glass) between them, a closed, evacuated, hermetically sealed, reference cavity, chamber or interstice 14 being formed between the two silicon layers 11, 12. The chamber 14 is typically at a zero vacuum or can be sealed at a higher reference pressure, at which reference level the diaphragm 11 is parallel to the silicon substrate 12, with typically a two micrometer spacing between the two.

It should be understood that the simplified drawings hereof for practical purposes of illustration are not at all to relative scale, as the glass wall or spacer 13/16 is only typically nine micrometers high, in contrast to the thicknesses of the silicon layers 11 and 12, which typically are eight thousandths (0.008") of an inch and fifty thousandths (0.050") inches thick, respectively, for an exemplary fifty (50 psi) pounds per square inch pressure measuring unit.

A centrally located, typically circular pedestal or mesa 12A extends into the typically generally cylindrical, closed chamber 14 with a thin, insulating layer of glass 13A (not shown in FIG. 1A) covering the top of the mesa. Due to the thinness of the layer 13A, typically only a half of a micrometer, which is usually deposited after the relatively high wall 16 (typically nine micrometers), it does not substantially contribute to any long term drift problems of the sensor 10, and its changing characteristics over the long term (e.g. 20 years) can be ignored, in so far as the present invention is concerned.

As the external ambient pressure on the outside of the sensor 10 varies, the diaphragm 11 flexes, causing the spacing between the silicon layers 11 and 12, serving as capacitive plates, to change, in turn changing the capacitance of the sensor. This change in capacitance as a result of a change in the exterior pressure on the exterior surface or upper-side 17 of the diaphragm 11 is used as a measure of the pressure and its changes.

Conductors or electrodes 18A and 18B (not illustrated in FIG. 1 for simplicity purposes) to the silicon layers 11 and 12 are included for connecting the transducer or sensor 10 into an appropriate circuit, many of which are known to the art, which measures its changing capacitance as a function of the pressure. The varying pressure on the exterior, sensing surface 17 of the elastic silicon diaphragm 11, causing the diaphragm to flex, changes the value of the interstitial capacitance between the diaphragm and the electrode to the lower silicon substrate 12, which transduces the applied pressure to a measurable electronic signal. Typically, as noted above, there is about an exemplary two micrometer gap between the inner, lower, underside surface of the diaphragm 11 and the top or upper-side of the mesa 12A, when the sensor is at its zero or reference pressure, to allow room for the diaphragm to flex inwardly toward the mesa 12A, as the pressure increases.

Critical stress region(s) 15 occur(s) at the inner, edge interface between the flexible silicon diaphragm 11 and the wall(s) formed by the vertically extended, peripheral portions 16 of the dielectric spacer 13, due to the flexing movement of the diaphragm about the region(s), as the ambient or sensed pressure changes. The wall(s) 16 might typically have a horizontal, lateral or radial thickness of, for example, thirty-six thousandths (0.036") of an inch with a height of, for example, nine (9) micrometers, while the separately applied, insulating, mesa layer of glass is only about a half a micrometer thick. The mesa 12A extends up from the main surface of the silicon substrate 12 an exemplary six and a half micrometers, while having an exemplary diameter of one hundred and fifty thousandths (0.150") of an inch.

The silicon diaphragm 11 and the silicon base 12 may typically be square [with corners removed for the purpose of providing access for electrical contacts to the layer(s), as illustrated], having a horizontal length of an exemplary two hundred and sixty thousandths (0.260") of an inch on an edge, while the spacer wall 16 can have an inner diameter of an exemplary one hundred and ninety thousandths (0.190") of an inch. The outer, side surface of the wall spacer 16 can either follow the basic square configuration of the silicon layers or having an outer circular configuration.

As can be seen in FIG. 1A, a transition piece 18 is bonded through an exemplary glass layer 20 to the upper, exterior surface 17 of the diaphragm 11 and includes a pressure port 19, through which the pressure to be sensed is communicated to the diaphragm. In turn the sensor 10 is appropriately mounted for use in the desired application. These packaging aspects form no part of the present invention.

An exemplary, prior art, three plate, silicon-glass-silicon (SGS) device is particularly described in assignee's U.S. Pat. No. 4,467,394 of Grantham & Swindal. Due to the relative sizes and electrical characteristics of the three plates, the dielectric wall spacer 16 at the peripheral, outer, peripheral regions of the device can account for approximately fifty (50%) percent of the total capacitance of such a prior art sensor, that is, about one (1) part in two (2). This peripheral capacitance is considered parasitic and undesired, as it is pressure insensitive.

With the structural designs of the present invention, the contribution of the capacitance "$C_p$" of the peripheral, supporting, dielectric spacer wall to the overall capacitance of the sensor is reduced, for the baseline example, from about one (1) part in two (2) of the prior art down to, for example, a maximum of about one (1) part in six (6) with a minimum of about one (1) part in ten (10) invention; that is, from about fifty (50%) percent in the prior art down to, for example, about sixteen (16%) percent to about ten (10%) percent, or lower, in the invention. Accordingly, the overall sensor element drift rate is reduced by a commensurate amount.

Other prior art approaches may have achieved more favorable ratios than one (1) part in two (2) by the introduction of complex lead-throughs or by the substitution of an insulating structure for the silicon base of the existing design. However, these approaches are either more costly, because of the complexity they introduce, or they compromise the sensing element performance because of the gross introduction of dissimilar materials having expansion coefficients which do not ideally match.

A further approach is that of U.S. Pat. No. 4,597,027 of Lehto (issued 06/24/86), which includes recessing the dielectric layer down into the silicon substrate, so that it does not extend above the upper plane of the silicon substrate and no longer serves as a wall spacer, generates a number of other problems, including diminished precision, which makes its approach somewhat undesirable. This approach also requires that the peripheral edges of the diaphragm be extended down to, in essence, provide the wall spacing function of the glass wall spacer 16 of FIGS. 1-4 hereof, which approach, inter alia, causes problems with respect to the flexing of the diaphragm. In contrast the diaphragm 11 of the SGS "sandwich" sensor combination of the invention can be, and preferably is, flat, that is, it is uniform in thickness across its lateral extent, except for the possibility of providing an indentation of small width for a diaphragm hinge, as discussed in the co-pending application entitled "Capacitive Pressure Sensor With Hinged Silicon Diaphragm" (R-3288hs-ed) referred to above.

Some exemplary prior art patents in the field of capacitive pressure sensors or transducers, owned by the assignee hereof, are listed below:

| Patent No. | Title | Inventors | Issue Date |
|---|---|---|---|
| 4,530,029 | Capacitive Pressure Sensor With Low Parasitic Capacitance | C. D. Beristain | 07/16/85 |
| 4,517,622 | Capacitive Pressure Transducer Signal Conditioning Circuit | B. Male | 05/14/85 |
| 4,513,348 | Low Parasitic Capacitance Pressure Transducer and Etch Stop Method | D. H. Grantham | 04/23/85 |
| 4,467,394 | Three Plate Silicon-Glass-Silicon Capacitive Pressure Transducer | D. H. Grantham J. L. Swindal | 08/21/84 |
| 4,463,336 | Ultra-Thin Microelectronic Pressure Sensors | J. F. Black T. W. Grudkowski A. J. DeMaria | 07/31/84 |
| 4,415,948 | Electrostatic Bonded, Silicon Capacitive Pressure Transducer | D. H. Grantham J. L. Swindal | 11/15/83 |
| 4,405,970 | Silicon-Glass-Silicon Capacitive Pressure Transducer | J. L. Swindal D. H. Grantham | 09/20/83 |

DISCLOSURE OF INVENTION

Thus, in the present invention aging or drift in the electrical properties of the spacer in the silicon-on-silicon structure in pressure sensors has been identified as being the major contributing factor to the drift of the sensing or transducer element. With the structural designs method approaches of the present invention, the contribution of the capacitance of the peripheral, dielectric wall spacer to the overall capacitance of the sensor is substantially reduced down to, for example, a maximum of about one (1) part in four (4) or five (5) parts of the total sensor, capacitance, and more typically one (1) part in six (6) or about one (1) part in ten (10) or lower; that is, down to, a maximum of about twenty-to-twenty-five (20-25%) percent, and typically, for example, down to about sixteen (16%) percent or about ten (10%) or lower. As a result, the overall sensor element drift rate is unexpectedly reduced by a commensurate amount.

This disclosure of the invention provides three illustrated, exemplary approaches (as illustrated in FIGS. 2-4), namely, etching the outer edges of the dielectric wall spacer layer, making the wall(s) it forms thinner in its horizontal or lateral dimension (FIG. 2); and/or reducing the horizontal or lateral thickness or length of the effective peripheral, lower edge(s) of the silicon diaphragm, where it interfaces in contact with the wall(s) formed by the dielectric wall support(s) (FIG.

3); and/or reducing the horizontal thickness or vertical height of the effective peripheral, upper edge(s) of the silicon base or substrate where it interfaces with the wall(s) formed by the dielectric wall support(s) (FIG. 4).

These approaches are all relatively inexpensive and simple, and are easily incorporated in the manufacturing processes, yet they produce the unobvious and unexpected result of minimizing the long term drift of the sensor.

These approaches also avoid, for example, any gross introduction of dissimilar materials having expansion coefficients which do not ideally match, and yet minimizes the dielectric drift of the device.

Additional advantages of the preferred structures of the present invention are:

(1) a longer surface path for any electrical leakage from one silicon layer to the other across the surface of the dielectric spacer wall, i.e., from an exemplary nine (9) microns to typically about six hundred and fifty (650) microns, namely by a factor of about seventy (70) or more; and (2) as a consequence of the reduced, overall sensing element capacitance, a sensitivity increase is achieved with devices having similar diaphragm thicknesses.

The foregoing and other features and advantages of the present invention will become more apparent from the following further description and drawings, in which drawings like reference numbers have been used across the figures.

MODES FOR CARRYING OUT THE INVENTION

Contained in FIGS. 2, 3 and 4, all of which may have similar dimensions except as explained below, are three schematic or simplified representations of improved sensing element structures designed in accordance with the principles of the present invention to minimize the electrical effects of the performance of the dielectrical spacer on the overall electrical drift characteristics of the sensing elements. Each of these embodiments use as a baseline the prior art sensor of FIGS. 1A and 1, in order to best bring out the differences in approach and structure of the present invention in contrast to the prior art. Thus, except as otherwise mentioned with respect to the changes to the peripheral parts of the sensor involving directly or indirectly the glass wall spacer 16 discussed below, the structures may otherwise be and preferably are substantially the same.

Figure 1:
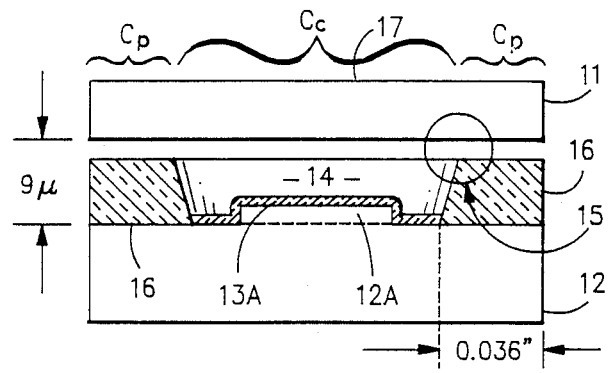
FIG. 1 is a side, simplified view of a silicon-on-silicon capacitive pressure sensor of FIG. 1A, but with the pressure port transition piece removed to better show the parts more relevant to the present invention, and with the silicon diaphragm "exploded" up off its support spacer wall(s). Of course, in its final assembly the diaphragm is bonded and sealed to its glass support structure to form with the silicon base a hermetically sealed chamber.
Figure 2:
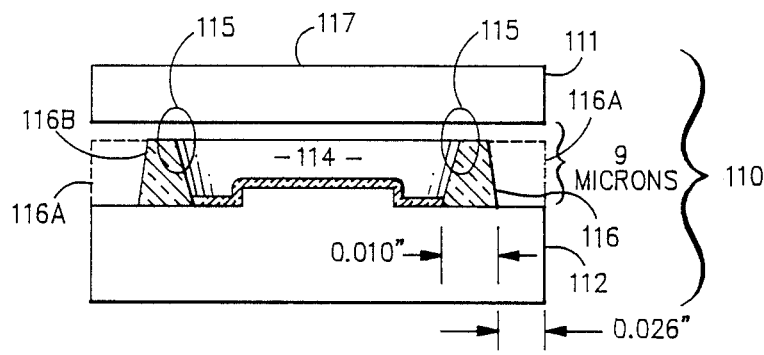
FIG. 2 is a side, simplified view, similar to that of FIG. 1, but of a first embodiment of the silicon-on-silicon capacitive pressure sensor structure of the present invention for minimizing the dielectric drift of the sensor, in which the effective dielectric support wall thickness has been decreased in its horizontal or lateral dimension by etching away an exterior amount or portion.

With reference to FIG. 2, the new structure, having minimized dielectric drift, is produced by the simple expedient of etching away the outer, peripheral edge portion 116A of the glass wall spacer 116 employed in the baseline design illustrated in FIG. 1 Structurally this design should not, and does not in the example hereof, materially increase the operating stress levels in the critical interior glass-silicon diaphragm interface region 115 of the vacuum reference cavity 114 over that of the baseline, prior art design of FIG. 1. However, in contrast to the relatively large, horizontal, dielectric wall thickness of thirty-six thousandths (0.036") of an inch in the prior art structure of FIGS. 1A and 1, the effective thickness of the wall 116 in the inventive structure of FIG. 2 is only an exemplary ten thousandths (0.010") of an inch thick, an exemplary thickness of twenty-six thousandths (0.026") of an inch having been etched away. As a result of the removal of the peripheral portion 116A, the peripheral edge of the silicon diaphragm 111 extends out laterally past the outer wall surface 116B of the spacer wall 116 a significant distance, for example, twenty-six thousandths (0.026") of an inch.

However, some significant thickness of the wall 116, of course, must remain to effectively hermetically close off the sides of the chamber 114 and to have sufficient width to not cause too high of a stress at the silicon-glass support interface, as the diaphragm 111 flexes down about the interface into the chamber under the changing pressure being sensed and felt at its upper surface 117.

Figure 1A:
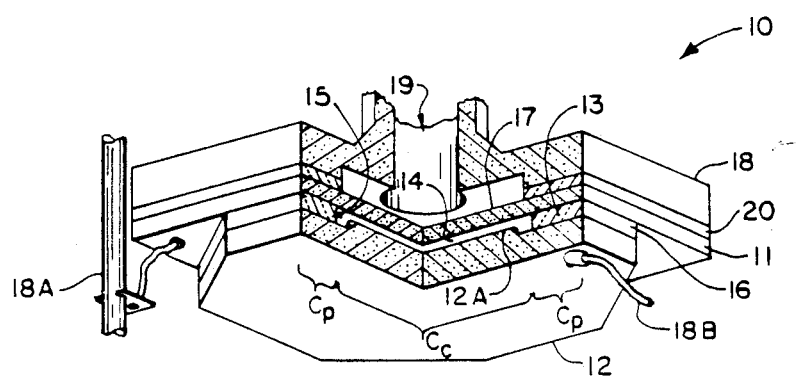
FIG. 1A is a perspective, partially cut-away view of the silicon-on-silicon capacitive pressure sensor of the prior art, which, with the changes of the invention, also provides the preferred combination or application of the present invention.

In addition to reducing the effective percentage capacitance contribution of the peripheral dielectric spacer 116 to the sensor 110, the structure of FIG. 2 also provides more precise control over the overall total capacitance of the sensing element, since the outer dielectric edge 116B is defined by photolithograhic processes, rather than, for example, a saw-cut edge resulting from the dicing processes, as is the case in the baseline design of FIGS. 1A and 1. Another benefit of the photolithographic process is that small cracks, which do occur in a saw-cut, are eliminated.

Figure 3:
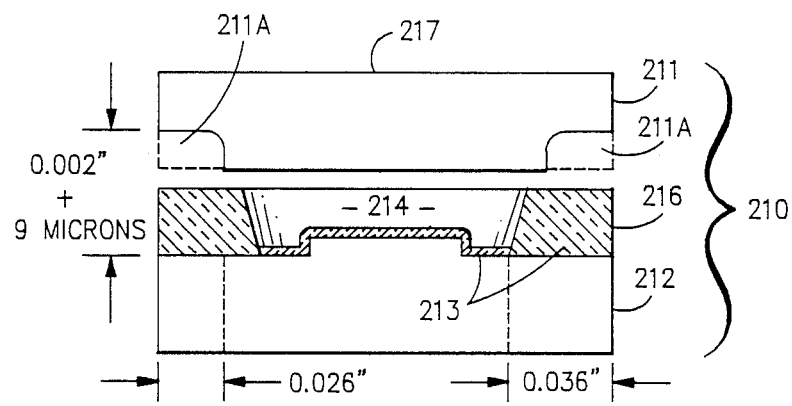
FIG. 3 is a side, simplified view, similar to that of FIG. 1, but of a second, alternative embodiment of the silicon-on-silicon capacitive pressure sensor structure of the present invention for minimizing the dielectric drift of the sensor, in which the part of the effective peripheral vertical height between the two silicon layers has been increased by removing a bottom portion of the peripheral edge of the upper silicon diaphragm.
Figure 4:
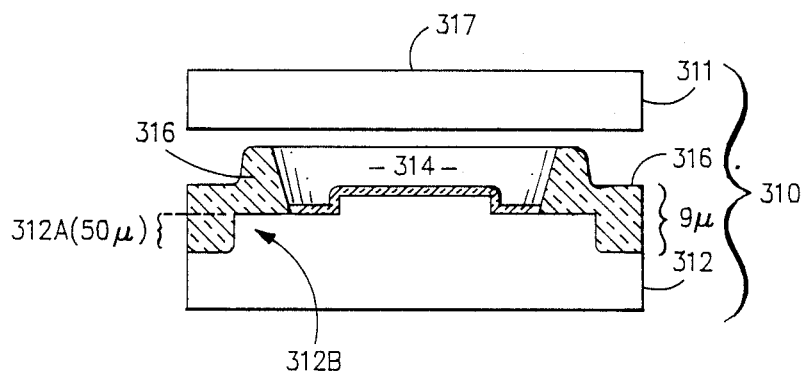
FIG. 4 is a side, simplified view, similar to that of FIG. 1, but of a third, alternative embodiment of the silicon-on-silicon capacitive pressure sensor structure of the present invention for minimizing the dielectric drift of the sensor, in which in combination the effective peripheral vertical height between the two silicon layers has been increased by removing an upper portion of the peripheral edge of the lower, silicon substrate.

Presented in FIGS. 3 and 4 are further, exemplary variants of the subject design, which do require additional processing steps in fabrication but also further reduce the peripheral glass dielectric contribution to the overall sensor capacitance, minimizing long term drift, and also provide a more debris tolerant, outer edge structure.

In the approach of FIG. 3 the horizontal thickness of the effective peripheral, lower edge(s) of the silicon diaphragm is reduced where it interfaces with the wall(s) 216 formed by the dielectric layer 213; while in the approach of FIG. 4 the horizontal thickness of the effective peripheral, upper edge(s) of the silicon base or substrate where it interfaces with the wall(s) formed by the dielectric layer is reduced.

In the sensor structure of FIG. 3, the effective, peripheral edge separation distance between the outer edges of the silicon layers 211 and 212 has been increased from only the exemplary nine (9) microns for the baseline structure of FIG. 1 to an exemplary additional two thousandths (0.002") of an inch. Additionally, the interfacing silicon-to-glass contact area 218 between the silicon diaphragm 211 and the dielectric walls 216 has been reduced from a relatively large thickness of thirty-six thousandths (0.036") of an inch to an exemplary ten thousandths (0.010") of an inch, an exemplary twenty-six thousandths (0.026") gap or peripheral portion 211A having been removed about the periphery of the sensor 210.

In the approach of FIG. 4, the effective peripheral vertical height between the two silicon layers 311 and 312 has been increased by removing an upper, outer edge portion 312A of the peripheral edge of the lower, silicon substrate 312 to an exemplary depth of fifty micrometers, as opposed to the "normal" or prior art spacing of the nine micrometers provided by the spacer wall 316. As a result of the removal of the outer edge portion 312A, the silicon substrate 312 has a peripheral area which is lower than the more inner portion 312B, which is under the spacer wall 316, which actually supports the diaphragm 311 above the substrate. This effectively decreases the directly interfacing area between the diaphragm plate 311 and the substrate plate 312 which has the dielectric wall layer 316 directly in line between them.

With respect particularly to the illustration of FIG. 4, as noted above, the drawing is not to relative scale, and, in fact, the removed portion 312A along the periphery of the silicon base 312 is approximately an exemplary five and a half (5.5) times greater in thickness or depth than the height of the wall spacer 316 (an exemplary fifty vs. nine micrometers), which is deposited on the silicon substrate 312 after the peripheral portion 312A has been removed.

Devices having the design of FIG. 4 have been fabricated and tested. Overall dielectric reductions by a factor of eight (8) have been achieved with concomitant reductions in sensing element drift observed experimentally.

A further approach under the invention would be to increase the height of the support wall spacer with a concomitant increase of the protrusion of the mesa into the reference cavity chamber, while still maintaining the exemplary two micrometer spacing at the zero or pressure reference level between the underside of the diaphragm and the upper-side of the substrate.

The three exemplary approaches of FIGS. 2-4, as well as other approaches to the problem, can be alternatively or conjunctive used, as desired. As is well known, a number of factors influence the peripheral capacitance produced in conjunction with the glass spacer Wall 16-316, including the effective separation distances between the capacitor plates, namely the silicon layers, the permativity of the wall spacer material, the horizontal, interfacing or juxtapositioned effective capacitive plate area(s) involved, etc.

As noted above, for disclosure purposes, the three exemplary embodiments of the invention (FIGS. 2-4) used as a starting baseline the prior art embodiment of FIGS. 1A and 1 . However, in regular commercial use, the sensors having minimized dielectric drift in accordance with the principles of the present invention would be designed from the beginning with the desirata of minimizing within functional reason the capacitance contribution of the dielectric spacer wall to the total capacitance of the sensor, with the dielectric layer's contribution being no more than about twenty to twenty-five percent of the total and more preferably being about sixteen percent or less of the total. When so designed from the beginning, its appearance may be substantially different than that illustrated in FIGS. 2-4. Additionally, as known to those of ordinary skill, other approaches to minimizing the dielectric layer's contribution to the total capacitance of the sensor are also possible, the three detailed above being merely exemplary.

Additionally, it should be understood that in using the terms "above" or "below" or vertically or horizontally, these terms are being used in an exemplary relative sense, as presented in the drawings hereof. Thus, for example, in a particular application the silicon substrate could in fact, of course, be below the diaphragm and, rather than the silicon layers being horizontally disposed with the wall spacer being vertical, the silicon layers could be vertically disposed or disposed at an acute angle to the horizontal, with the dielectric layer appropriately positioned relative to them.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

1. A capacitive sensor of the silicon-dielectric-silicon type used to sense physical changes, such as, for example, pressure changes, comprising:
    a conductive silicon substrate;
    a conductive, elastic, flexible silicon diaphragm having an exterior side, said diaphragm being capable of flexing movement due to physical changes being sensed; and
    a non-conductive, dielectric wall spacer layer between said silicon substrate and said silicon diaphragm, said layer providing peripheral wall(s) extending substantially above said silicon substrate and joining said silicon substrate and said silicon diaphragm together; an evacuated, closed, hermetically sealed chamber being formed between said silicon substrate and said silicon diaphragm and being closed off at the sides above said substrate by said wall(s) formed by said dielectric layer between said silicon substrate and said silicon diaphragm; the flexing movement of said silicon diaphragm due to the physical changes being sensed causing the capacitance of the sensor to vary; the capacitance contribution of said dielectric layer to the total capacitance of the sensor being no more than about twenty-to-twenty-five percent of the total capacitance of the sensor.

2. The capacitive sensor of claim 1, wherein the lateral wall thickness of said dielectric layer is substantially less than thirty-six thousandths of an inch.

3. The capacitive sensor of claim 2, wherein said lateral wall thickness is no more than about ten thousandths of an inch.

4. The capacitive sensor of claim 1, wherein there is a radial, interfacing, peripheral contact area between said dielectric layer and said diaphragm, and wherein said radial, interfacing, peripheral contact area between said dielectric layer and said diaphragm is no more than about ten thousandths of an inch, while said diaphragm extends laterally out past said wall a significant amount.

5. The capacitive sensor of claim 1, wherein said silicon diaphragm is no thicker at its peripheral edges in contact with said spacer wall than it is in its center.

6. The capacitive sensor of claim 5, wherein said diaphragm is of uniform thickness across its lateral extent.

7. The capacitive sensor of claim 1, wherein there is included said percentage is no more than about sixteen percent of the total.

8. The capacitive sensor of claim 1, wherein said diaphragm has a peripheral area whose lowermost extent is spaced above said spacer wall.

9. The capacitive sensor of claim 1, wherein said silicon substrate has a peripheral area which is lower than a more inner portion which is under said spacer wall.

10. A method of minimizing the dielectric drift of a capacitive, silicon-dielectric-silicon sensor used to sense physical changes, such as, for example, pressure changes, which sensor includes
    a conductive silicon substrate;
    a conductive, elastic, flexible, silicon diaphragm having an exterior side, said diaphragm being capable of flexing movement due to he physical changes being sensed; and
    a non-conductive, dielectric wall spacer layer between said silicon substrate and said silicon diaphragm, said layer providing peripheral wall(s) extending substantially above said silicon substrate and joining said silicon substrate and said silicon diaphragm together; an evacuated, closed, hermetically sealed chamber being formed between said silicon substrate and said silicon diaphragm and being closed off at the sides above said substrate by said wall(s) formed by said kielectric layer between said silicon substrate and said silicon diaphragm; the flexing movement of said silicon diaphragm due to the physical changes being sensed causing the capacitance of the sensor to vary; comprising the following step(s):
    limiting the capacitive contribution of said dielectric wall spacer layer to the total capacitance of the sensor to no more than about twenty to twenty-five percent of the total capacitance of the sensor.

11. The method of claim 10, wherein there is included the following step(s):
    limiting the wall thickness of said dielectric support wall layer to substantially less than thirty-six thousandths of an inch.

12. The method of claim 11, wherein in the step of claim 11, there is included the following step(s):
    limiting the wall thickness of said dielectric support wall layer to no more than about ten thousandths of an inch.

13. The method of claim 10, wherein there is included the following step(s):
    limiting the radial, interfacing, peripheral contact area between said dielectric wall layer and said diaphragm to no more than about ten thousandths of an inch, while said diaphragm extends laterally out past said dielectric wall a significant amount.

14. The method of claim 10, wherein there is further included the following step(s):
    in the process of manufacturing said sensor, etching away an exterior, side portion of said dielectric spacer wall, significantly reducing its lateral thickness.

15. The method of claim 10, wherein there is further included the following step(s):
    removing a peripheral, edge portion of said diaphragm, reducing the amount of interfacing contact area between the diaphragm and its supporting dielectric wall layer.

16. The method of claim 10, wherein there is further included the following step(s):
    removing a peripheral, upper, edge portion of said substrate, increasing the effective separation distance between the peripheral edge portion of said substrate and the diaphragm and producing a area smaller in thickness than a more inner portion of said substrate which is under said spacer wall layer, decreasing the interfacing area between said diaphragm and said substrate which has said dielectric wall layer directly in line between them.

* * * * *